Feb. 5, 1946. J. M. STRANG 2,394,340
RANGEFINDER, HEIGHTFINDER, AND LIKE OPTICAL MEASURING INSTRUMENT
Filed May 25, 1943 2 Sheets-Sheet 1
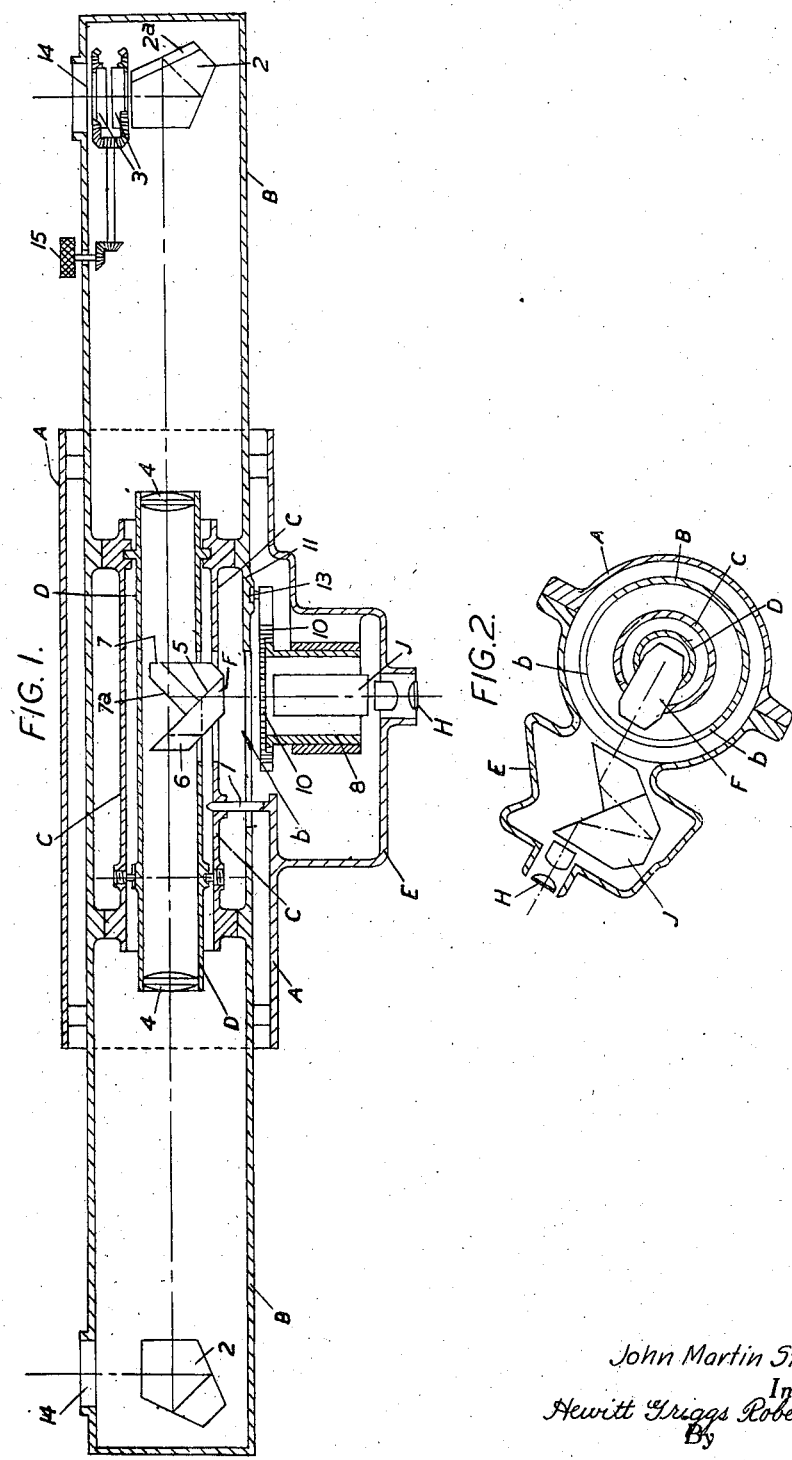
John Martin Strang
Inventor
Hewitt Griggs Robertson.
By
Attorney Feb. 5, 1946.  J. M. STRANG  2,394,340
RANGEFINDER, HEIGHTFINDER, AND LIKE OPTICAL MEASURING INSTRUMENT
Filed May 25, 1943  2 Sheets-Sheet 2
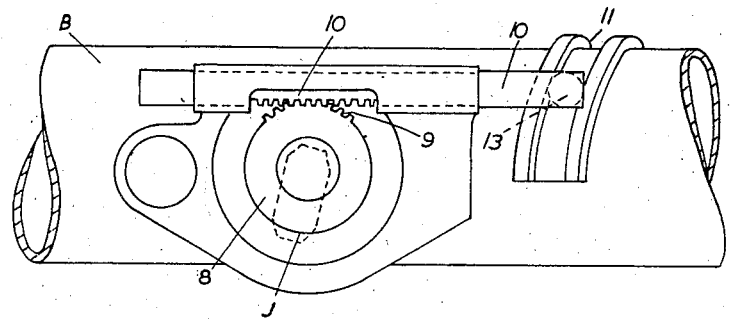
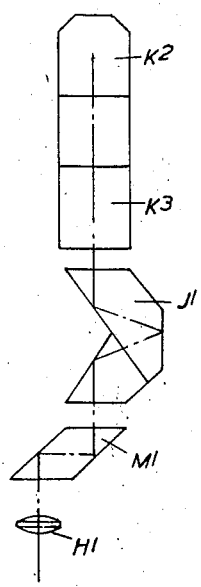
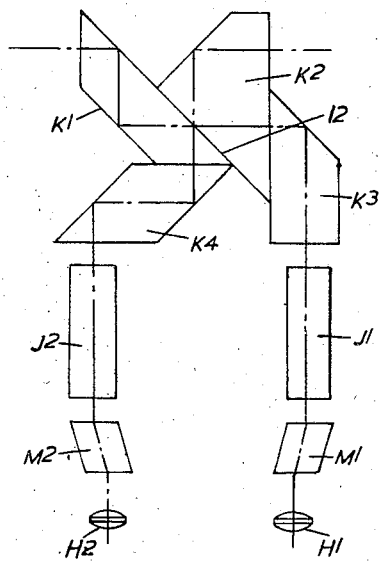
Inventor
John Martin Strang
By
Attorney Patented Feb. 5, 1946

2,394,340

UNITED STATES PATENT OFFICE 2,394,340

RANGE FINDER, HEIGHT FINDER, AND LIKE OPTICAL MEASURING INSTRUMENT

John Martin Strang, Glasgow, Scotland, assignor to Barr & Stroud, Limited, Glasgow, Scotland Application May 25, 1943, Serial No. 488,451
In Great Britain August 27, 1940

3 Claims. (Cl. 88—2.7)

This invention refers to rangefinders, heightfinders, and like optical measuring instruments of the self-contained base type. Such instruments comprise a tubular base casing, light entrance windows, one at or near each end of the base casing, and two end reflectors within the casing, one at each window to receive light entering through the window and to direct it along the base casing by way of an objective to a central reflecting system at or near the middle of the base casing. The central reflecting system then directs the light at or approximately at right angles to the base to an eyepiece or to binocular eyepieces, there being in one or both beams of light a movable light deviating prism element by movement of which measurement is effected.

Movement of the instrument necessary for elevation or depression of the line of sight from the instrument to the object under observation ordinarily involves corresponding inclinational movement of the eyepiece (or eyepieces) although it has been proposed to construct instruments in which the eyepiece (or eyepieces) remains stationary while the line of sight is elevated or depressed.

The object of the present invention is to provide in an improved manner for the eyepiece (or eyepieces) remaining stationary during elevational variation of the line of sight.

According to this invention, the end reflectors and measuring prism arrangement of the instrument undergo inclination in the course of elevation or depression of the line of sight, while the objectives, the central reflecting system, and the eyepiece (or eyepieces) are maintained stationary.

The inclination of end reflectors of the usual pentagonal prism type relative to the central reflecting system would have the effect of tilting the images in the image field in opposite senses and in carrying the invention into practice one of the two beams is inverted at its pentagonal prism and re-erected at the central reflecting system, so that the inclination of the pentagonal prism causes tilting of the images in the same sense. In certain cases tilting of the images in the same sense may be no objection, for example, in the case of an instrument of the over-lapping image type where two identical images are presented to the eye of the observer in the same field and measurement is effected by bringing the two images into exact register, or in the case of stereoscopic range-finding instruments provided with symmetrical graticule markings, for example, where the graticule consists of a series of concentric circles.

In accordance with the invention, however, means may be provided for annulling the tilting effect referred to, so that the images in the image field maintain a constant attitude regardless of the inclination of the line of sight.

This may be effected by means of an erecting prism through which light passes in its path from the central reflecting system to the eyepiece, the prism being rotated by the action of elevating or depressing the line of sight. In the case of instruments having binocular eyepieces, viz. stereoscopic instruments and a certain construction of instrument of the overlapping image type, two such erecting prism arrangements may be employed, one for each eyepiece.

The invention will now be described with reference to the accompanying drawings, in which:

Figure 1 is a sectional plan view showing a rangefinder of the overlapping image type, Figure 2 is a corresponding transverse sectional view, Figure 3 is a view showing constructional details on an enlarged scale, while Figure 4 shows in plan optical details of another form of instrument, and Figure 5 is a side view corresponding with Figure 4.

Referring to Figures 1, 2 and 3, these show an outer bearing tube or cradle A which forms part of the pedestal or other support of the instrument, a tubular base casing B which is rotatable about its longitudinal axis in the cradle A, an inner bearing tube C which is mounted in bearings within the base casing B but held against rotation by connection at 1 with the cradle A, an inner frame D of tube form fixedly carried in the inner bearing tube C, and an eyepiece mounting E carried by the cradle A. Thus, the base casing B can be turned about its axis while the inner frame D and eyepiece mounting E remain stationary, the base casing B having an opening b at its eyepiece side.

The base casing B carries end pentagonal prisms 2 and a pair of prisms 3 which are geared for simultaneous rotation in opposite senses about the axis of the beam of light entering through the righthand window 14 of the base casing B, such rotation being effected from an operating head 15 for measuring purposes. The inner frame D carries objectives 4 at its ends and a prism combination P at its centre. The right hand prism 2 has a roof face 2a.

In the eyepiece mounting E there is an eyepiece H, and between the eyepiece H and the central prism combination F there is an erecting prism J which is rotatable about the eyepiece axis, as hereinafter described.

Within the prism combination F there is a semi-metallised light transmitting and reflecting screen 5 between two contacting prisms 6 and 7 of the combination, the prism 7 having a roof face 7a, to re-erect the beam from the right hand prism 2. The function of this screen 5 is partially to transmit and partially to reflect light directed on to its opposite faces from the two pentagonal prisms 2, the path of the light being shown by chain dotted lines. The reflected portion of the left hand beam and the transmitted portion of the right hand beam are together directed from the screen 5 into the eyepiece H, while the transmitted portion of the left hand beam and the reflected portion of the right hand beam pass off to the right and are not used. In elevating or depressing the line of sight, the observer turns the casing B and the end pentagonal prisms 2 and measuring prisms 3, while the optical parts mounted in the inner frame D do not undergo this turning motion, the eyepiece H likewise remaining stationary in elevation.

To prevent tilting of the images as a result of the relative inclination between the end pentagonal prisms 2 and the prism combination F, the erecting prism J is provided, this prism being mounted in a cylindrical carrier 8 which is rotatable in the eyepiece mounting E. Carrier 8 has a circular toothed part 9 which is engaged by a transversely sliding rack 10, see Figure 3, which is a view looking along the eyepiece axis. On the base casing B of the rangefinder there is a helical cam 11 with which a roller 13 at one end of the rack 10 engages. Thus, as the base casing B is turned, a transverse sliding motion is imparted to the rack 10, which causes rotation of the carrier 8 and prism J. The prism J re-erects the image.

Figures 4 and 5 show the application of the present invention to a rangefinder of the overlapping image type provided with binocular eyepieces, in accordance with our co-pending British patent application No. 12,976/40, the figures showing only the central prism combination, erecting prisms, and eyepieces.

The central prism combination comprises four prisms K¹, K², K³, and K⁴, with a light transmitting and reflecting screen at 12. As will be apparent, all the light from the right hand and left hand beams is, apart from transmission losses, utilised in one or other of the eyepieces. There are two rotatable erecting prisms J¹, J², one for each eyepiece, identical with that already described, the prisms being adapted to be rotated by the same amount in the same sense at the same time. Two stationary step prisms M¹, M², are shown between the prisms J¹, J², and the eyepieces H¹, H², to bring the two beams of light into the alignment desired for the eyepieces.

I claim:

1. A rangefinder, heightfinder or like optical measuring instrument of the self-contained base type comprising a cradle, a tubular base casing journalled in said cradle for rotation about the longitudinal axis of the casing, a light entrance window near each end of the base casing, end reflectors and a measuring prism arrangement within and movable with said base casing as it rotates in the cradle, an inner bearing frame carried in the interior of the base casing and rotatable relative thereto, said frame extending to both sides of the centre of the base casing, a central reflecting system carried in and by said frame, two objectives carried by said frame, one on each side of said central reflecting system, a rigid connection between the cradle and the frame passing through an opening in the base casing to prevent rotation of the frame as the base casing rotates, an eyepiece mounting carried by the cradle, an eyepiece assembly carried by said eyepiece mounting, an erecting prism arrangement located between the central reflecting system and said eyepiece assembly, a rotatable carrier arrangement for said erecting prism arrangement, and gearing connecting said carrier arrangement to the base casing so that the carrier arrangement and erecting prism arrangement are rotated by rotation of said base casing but at half the angular speed thereof.

2. A rangefinder, heightfinder or like optical measuring instrument of the self-contained base type comprising a cradle, a tubular base casing journalled in said cradle for rotation about the longitudinal axis of the casing, a light entrance window near each end of the base casing, end reflectors and a measuring prism arrangement within and movable with said base casing as it rotates in the cradle, one of the end reflectors having a beam inverting roof face, an inner bearing frame carried in the interior of the base casing and rotatable relative thereto, said frame extending to both sides of the centre of the base casing, a central reflecting system carried in and by said frame, the central reflecting system having an inverting roof face corresponding with that of the end reflector, two objectives carried by said frame, one on each side of said central reflecting system, a rigid connection between the cradle and the frame passing through an opening in the base casing to prevent rotation of the frame as the base casing rotates, an eyepiece mounting carried by the cradle, an eyepiece carried by said eyepiece mounting, an erecting prism located between the central reflecting system and said eyepiece, a rotatable carrier for said erecting prism, and gearing connecting said carrier to the base casing so that the carrier and erecting prism are rotated by rotation of said base casing but at half the angular speed thereof.

3. A rangefinder, heightfinder or like optical measuring instrument of the self-contained base type comprising a cradle, a tubular base casing journalled in said cradle for rotation about the longitudinal axis of the casing, a light entrance window near each end of the base casing, end reflectors and a measuring prism arrangement within and movable with said base casing as it rotates in the cradle, an inner bearing frame carried in the interior of the base casing and rotatable relative thereto, said frame extending to both sides of the centre of the base casing, a central reflecting system carried in and by said frame, two objectives carried by said frame, one on each side of said central reflecting system, a rigid connection between the cradle and the frame passing through an opening in the base casing to prevent rotation of the frame as the base casing rotates, an eyepiece mounting carried by the cradle, binocular eyepieces carried by said eyepiece mounting, two erecting prisms, one located between the central reflecting system and each eyepiece, two rotatable carriers one for each erecting prism, and gearing connecting said carriers to the base casing so that the carriers and erecting prisms are rotated by rotation of said base casing but at half the angular speed thereof.

J. MARTIN STRANG.